US009712452B2

(12) United States Patent
Walke

(10) Patent No.: US 9,712,452 B2
(45) Date of Patent: Jul. 18, 2017

(54) SYSTEM AND METHODS FOR IMPROVING SUPPORT OF A VIRTUAL SUBSCRIBER IDENTITY MODULE (SIM) IN A MULTI-SIM WIRELESS COMMUNICATION DEVICE

(71) Applicant: QUALCOMM Incorporated, San Diego, CA (US)

(72) Inventor: Simon Walke, Basingstroke (GB)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/933,376

(22) Filed: Nov. 5, 2015

(65) Prior Publication Data

US 2017/0134298 A1    May 11, 2017

(51) Int. Cl.
*H04L 12/865* (2013.01)
*H04B 1/3816* (2015.01)
(Continued)

(52) U.S. Cl.
CPC ....... *H04L 47/6275* (2013.01); *H04B 1/3816* (2013.01); *H04M 15/7556* (2013.01); *H04W 4/001* (2013.01)

(58) Field of Classification Search
CPC ........... H04L 29/06802; H04L 63/0853; H04L 47/50; H04L 47/521; H04L 47/621; H04L 47/6215; H04L 47/6255; H04L 47/6295; H04L 49/3018; H04L 49/3027; H04L 49/3036; H04L 49/3045; H04L 49/90; H04L 41/24; H04L 41/28; H04L 41/50;
(Continued)

(56) References Cited

U.S. PATENT DOCUMENTS

| 8,862,178 B2 | 10/2014 | Krishnaswamy et al. |
| 2003/0181216 A1 | 9/2003 | Tsai et al. |

(Continued)

FOREIGN PATENT DOCUMENTS

| CN | 102917339 A | * | 2/2013 | ............ H04W 8/183 |
| EP | 2605562 A2 | | 6/2013 | |
| WO | 2014122588 A1 | | 8/2014 | |

OTHER PUBLICATIONS

"Cloud Computing—Phone Call as a Service: A Concept"; Monica et al.; 2013.*

(Continued)

*Primary Examiner* — Benjamin H Elliott, IV
(74) *Attorney, Agent, or Firm* — Changwoo Yang

(57) ABSTRACT

Methods and devices for scheduling data packet transmissions on a multi-subscriber identity module (SIM) wireless communication device having at least a first SIM and a virtual SIM (VSIM) application associated with a shared radio frequency (RF) resource may include detecting registration of a SIM profile for the VSIM application, in which the VSIM application is provisioned to operate as a VSIM, and determining whether a VSIM management procedure is required for the VSIM. When a VSIM management procedure is required for the VSIM, the wireless communication device may tag data packets associated with the required VSIM management procedure, select a prioritization policy for data packet transmissions on the RF resource, and apply the selected prioritization policy within a transmission queue on the RF resource.

30 Claims, 9 Drawing Sheets

(51) Int. Cl.
*H04M 15/00* (2006.01)
*H04W 4/00* (2009.01)

(58) Field of Classification Search
CPC ............. H04M 15/755; H04M 17/103; H04M 7/1275; H04W 72/10; H04W 72/121; H04W 72/1215; H04W 72/1242; H04W 72/1263; H04W 88/02; H04W 88/06; H04W 4/003; H04W 4/02
See application file for complete search history.

(56) References Cited

U.S. PATENT DOCUMENTS

| | | | | |
|---|---|---|---|---|
| 2010/0311468 | A1* | 12/2010 | Shi | H04W 4/003 455/558 |
| 2011/0117965 | A1* | 5/2011 | Gong | H04W 48/18 455/558 |
| 2013/0329639 | A1* | 12/2013 | Wietfeldt | H04W 88/06 370/328 |
| 2014/0342715 | A1 | 11/2014 | Gu et al. | |
| 2014/0380442 | A1* | 12/2014 | Addepalli | H04W 4/046 726/6 |
| 2015/0057044 | A1 | 2/2015 | Altman | |
| 2015/0289221 | A1 | 10/2015 | Nayak et al. | |
| 2015/0289314 | A1 | 10/2015 | Yang et al. | |
| 2016/0037329 | A1* | 2/2016 | Chong | H04W 76/02 455/422.1 |

OTHER PUBLICATIONS

"Multiple Subscriber-Identity-Module Detyection Using Social Network Analysis Techniques"; Maher et al.; 2014.*
"Subscriber Authentication in Cellualr Networks with trusted Virtual SIMs"; Kasper et al.; Feb. 2008.*
International Search Report and Written Opinion—PCT/US2016/058649—ISA/EPO—Feb. 1, 2017.

* cited by examiner

SYSTEM AND METHODS FOR IMPROVING SUPPORT OF A VIRTUAL SUBSCRIBER IDENTITY MODULE (SIM) IN A MULTI-SIM WIRELESS COMMUNICATION DEVICE

BACKGROUND

Multi-subscriber identity module (SIM) wireless communication devices have become increasing popular because of their flexibility in service options and other features. One type of multi-SIM wireless communication device, a multi-SIM multi-standby (MSMS) device, enables multiple SIMs to be in idle mode waiting to begin communications, but only allows one SIM at a time to participate in an active communication due to sharing of a single radio frequency (RF) resource (e.g., transceiver). Other multi-SIM devices may extend this capability to more than two SIMs, and may be configured with any number of SIMs greater than two (i.e., multi-SIM multi-standby wireless devices).

The SIM stores the necessary provisioning data that allows a wireless communication device to communicate with a wireless communications network. A SIM may be physical memory devices in form of a small smart card, such as a universal integrated circuit card (UICC). Multi-SIM wireless communication device may have two or more ports for receiving multiple physical SIMs. Additionally, a virtual SIM (VSIM) may be implemented as an application stored in memory on the wireless communication device. Similar to physical SIMs, a VSIM application may provide a provisioning profile (referred to herein as a "SIM profile") enabling access to a wireless communication network, including the data, authentication algorithms, cryptographic keys, and other information that enables a subscription to a network. VSIM applications may enable multiple subscription options on a wireless communication device.

SUMMARY

Systems, methods, and devices of various embodiments may enable a wireless communication device configured to use a physical SIM and a virtual SIM (VSIM) application, each associated with a shared radio frequency (RF) resource, to schedule data packet transmissions by detecting registration of a SIM profile for the VSIM application, determining whether a VSIM management procedure is required for the VSIM application, and in response to determining that the VSIM management procedure is required for the VSIM application, tagging data packets associated with the VSIM management procedure, selecting a prioritization policy for data packet transmissions on the RF resource, and applying the selected prioritization policy within a transmission queue on the RF resource.

In some embodiments, selecting the prioritization policy for data packet transmissions on the RF resource may be performed by a scheduler based on a type of data structure employed on the RF resource. Some embodiments may further include determining whether a modem stack associated with the physical SIM has an active data communication, and establishing a dedicated bearer for a modem stack associated with the VSIM application in response to determining that the modem stack associated with the physical SIM does not have an active data communication. Some embodiments may further include identifying an existing data bearer on the modem stack associated with the physical SIM in response to determining that the modem stack associated with the physical SIM has an active data communication, and implementing a proxy mechanism to allow data packets from the modem stack associated with the VSIM application to be carried on the existing data bearer. In some embodiments, the scheduler may select the first prioritization policy as the selected prioritization policy for data transmissions on the RF resource.

In some embodiments, applying the selected first prioritization policy may include determining whether the transmission queue includes any critical data packets from the modem stack associated with the physical SIM, and in response to determining that the transmission queue includes critical data packets from the modem stack associated with the physical SIM, assigning a first transmission priority to the critical data packets, assigning a second transmission priority to the tagged data packets associated with the required VSIM management procedure, and assigning a last transmission priority to non-critical data packets from the modem stack associated with the physical SIM. In some embodiments, applying the selected first prioritization policy may include, in response to determining that the transmission queue does not include any critical data packets from the modem stack associated with the physical SIM, assigning the first transmission priority to the tagged data packets associated with the required VSIM management procedure, and assigning the second transmission priority to non-critical data packets from the modem stack associated with the physical SIM.

Some embodiments may further include selecting, by the scheduler, a second prioritization policy as the selected prioritization policy for data transmissions on the RF resource, and assigning the dedicated bearer to enable communication on a network supported by the VSIM application. Some embodiments may further include assigning a first transmission priority to the tagged data packets associated with the required VSIM management procedure, and assigning a second transmission priority to data packets in user communications on the modem stack associated with the VSIM application.

In some embodiments, tagging data packets associated with the required VSIM management procedure may include attaching an additional identifier to data packets associated with the required VSIM management procedure. In some embodiments, the additional identifier may provide information describing a high priority of the VSIM management procedure and the VSIM application as a point of origin or destination. In some embodiments, the additional identifier may be conveyed throughout a modem stack associated with the VSIM application. In some embodiments, tagging data packets associated with the required VSIM management procedure may include providing an identifier within an existing information field in protocol data units (PDUs) for at least one layer in a modem stack associated with the VSIM application. In some embodiments, the required VSIM management procedure may be an authentication on a network associated with the VSIM application.

Various embodiments include a wireless communication device configured to use at least a physical SIM and a VSIM application associated with an RF resource, and including a processor configured with processor-executable instructions to perform operations of the methods described above. Various embodiments also include a non-transitory processor-readable medium on which is stored processor-executable instructions configured to cause a processor of a wireless communication device to perform operations of the methods described above. Various embodiments include a wireless communication device having means for performing functions of the methods described above.

BRIEF DESCRIPTION OF THE DRAWINGS

The accompanying drawings, which are incorporated herein and constitute part of this specification, illustrate exemplary embodiments, and together with the descriptions of various embodiments, serve to explain the features herein.

DETAILED DESCRIPTION

Figure 1A:
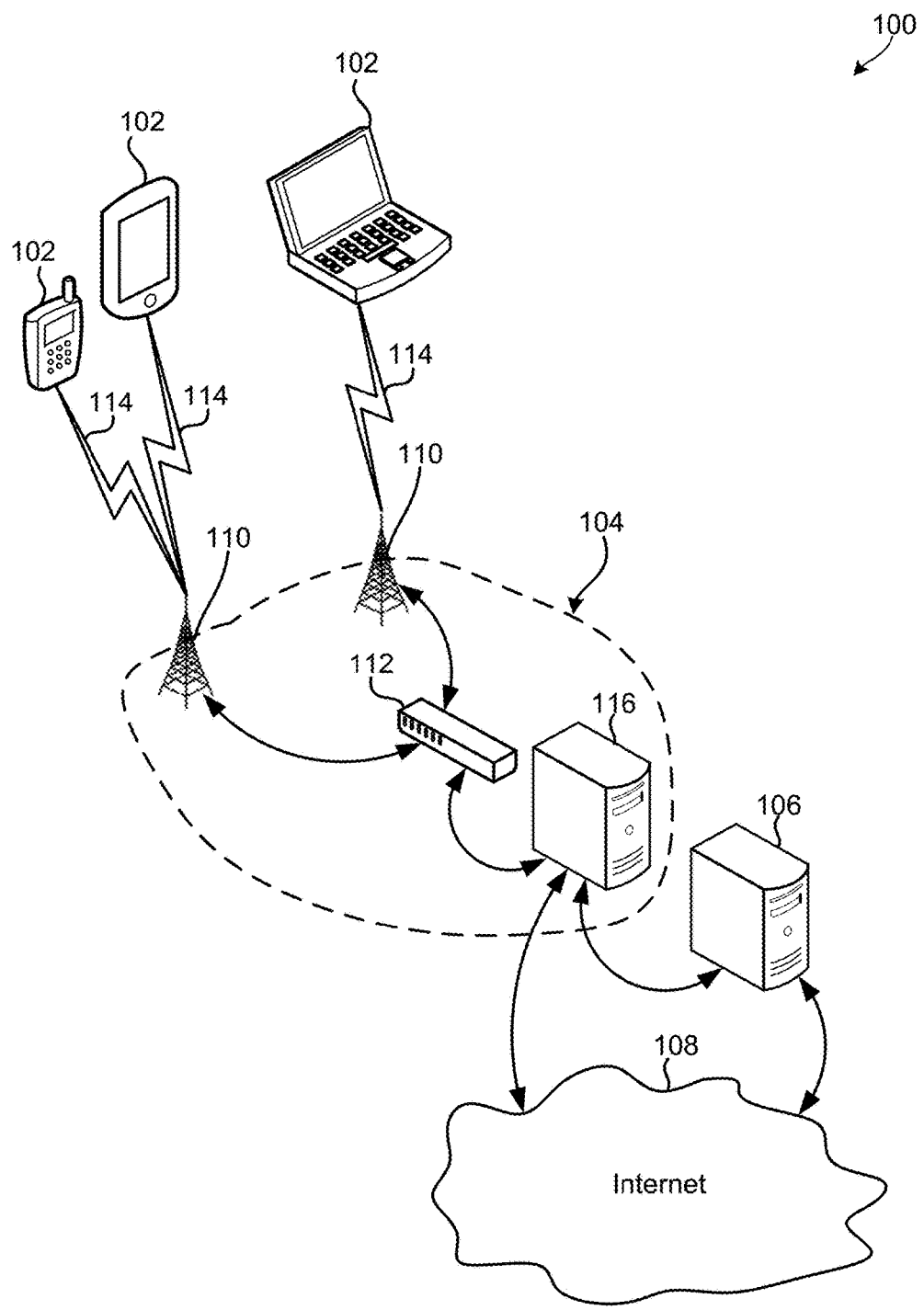
FIG. 1A is a communication system block diagram of a network suitable for use with various embodiments.

Various embodiments provide methods and devices for improving performance optimizing usage of a shared RF resource in a wireless communication device that supports at least one subscription through a VSIM application.

In a MSMS device that supports virtual SIM operations, additional SIMs may be provisioned using a Virtual SIM (VSIM) application in which a subscription management system provides traditional subscription features similar to a physical SIM. Some VSIM management procedures, such as over-the-air communications with network infrastructure supporting VSIM authentication, are critical to the VSIM architecture because the procedures are required to enable the VSIM application to perform normal SIM functions.

Normal RF resource arbitration may be employed to resolve conflicts in communication scheduling when there is contention for a shared RF resource between a physical SIM and a VSIM loaded in the VSIM application. However, when a conflict exists between VSIM management procedures and ongoing communication activity on a physical SIM, the normal RF resource arbitration is typically inefficient. Normal RF time sharing may take into account various priorities of types of communications (e.g., voice call compared to data session), but does not review the particular content within a same communication type. Specifically, such RF scheduling typically does not consider the heightened criticality of data packets in VSIM management communications. This can lead to communication problems in wireless communication devices implementing a VSIM.

To overcome such problems, various embodiments provide a scheduling mechanism that ensures priority for data communication in critical VSIM management procedures, without unilaterally prioritizing all communications on the VSIM. In various embodiments, the scheduling mechanism may be adaptive in that the scheduler may be configured to select an applicable prioritization based on the type of the underlying data bearer is based on the depending on the nature of the data bearer established for communication on the wireless device.

The terms "wireless device," "wireless communication device," "user equipment," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identity module" are used interchangeably to refer to a memory that may be an integrated circuit such as an UICC or embedded into a removable card, and that stores an International Mobile Subscriber Identity (IMSI), related key, and/or other information used to identify and/or authenticate a multi-standby communication device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP2 standard. Universal Integrated Circuit Card (UICC) is another term for SIM.

The terms subscription and SIM may also be used as shorthand reference to a communication network associated with a particular SIM, since the information stored in a SIM enables the wireless communication device to establish a communication link with a particular network, thus the SIM and the communication network, as well as the services and subscriptions supported by that network, correlate to one another.

As applied to a wireless communication device, the terms "multi-SIM," "multi-SIM multi-standby," "MSMS," "dual-SIM dual standby," and "DSDS" are used interchangeably to describe a wireless communication device that is configured with more than one SIM and allows idle-mode operations to be performed on two networks simultaneously, as well as selective communication on one network while performing idle-mode operations on the other network.

The term "server" is used herein to refer to any of a variety of commercially available computer systems configured to operate in a client-server architecture. In particular, the term "server" refers to network servers, particularly Internet or Intranet accessible servers, which typically include a processor, memory (e.g., hard disk memory), and network interface circuitry configured to connect the server processor to the network, such as the Internet or a cellular telephone network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a wireless communication device may have multiple subscriptions to one or more networks (e.g., by employing multiple subscriber identity module (SIM) cards or otherwise). Multi-SIM communication devices enable a user to implement two (or more) different wireless communication service subscriptions or plans with different service providers, with separate numbers and bills, on the same device (e.g., business account and personal account). Multi-SIM wireless devices can support multiple subscriptions to one or more wireless networks. For example, in a MSMS device, a first subscription may support networks using a first technology standard, while a second subscription may support a second technology standard. Such capabilities can provide convenience to a user, such as allowing different wireless carriers, plans, telephone numbers, billing accounts, etc. on one device.

Developments in multi-SIM wireless communication device technology have led to a variety of different options for such devices. Many multi-SIM wireless communication devices enable multiple subscriptions (supported by the multiple SIMs) to be active (i.e., able to receive calls and data) simultaneously. A popular type of multi-SIM wireless communication device allows multiple (i.e., two or more) SIMs to share a single transceiver (RF resource). Since multiple subscriptions are sharing the one RF resource, the multiple subscriptions take turns using the RF resource to monitor for page messages and other standby communications from each subscription's respective network. Such wireless communication devices are referred to as multi-SIM, multi-standby (MSMS) devices. Because a MSMS device uses one RF resource to support the communications of multiple SIMs and corresponding networks, only one SIM can actively communicate at a given time. Thus, when one SIM is active, the other SIM is idle without access to the RF resource. The idle SIM may periodically interrupt the active SIM to perform brief tune-aways in which the RF resource is tuned from a network or channel associated with the active SIM to a network or channel associated with the idle SIM, and back.

To reduce the costs and challenges of utilizing several physical SIMs in a roaming environment, a virtual SIM (VSIM) may be implemented as an application stored in memory on the wireless communication device. The VSIM application may enable multiple subscription options on the wireless device as different profiles, which the device may receive from a VSIM server using the connection on the first SIM. Thus, before traveling to another country, a user may use a first subscription enabled by a first SIM to download a VSIM supporting network connections in the destination country, so that upon arriving the user can communicate with a local network enabled by the provisioning in the VSIM application without incurring roaming charges.

Once a profile is provisioned on the wireless communication device through the VSIM application, the device must be authenticated by the associated wireless communication network in order to receive service. Since access to the shared RF resource for such authentication may conflict with ongoing activity on the first SIM, an arbitration scheme is typically implemented to allocate access between the first SIM and the VSIM application. However, traditional arbitration schemes may not take into account the content of communication activity/type of data being sent or received, including the relatively high priority of packets that are part of VSIM authentication procedures.

In order to utilize a VSIM on a wireless communication device, a VSIM application (e.g., on a software module, operating system, etc.) may obtain a SIM profile from a subscription management system. In some embodiments, the wireless communication device may connect with a subscription management system using a first wireless communication network associated with a physical SIM (i.e., the physical SIM stores the provisioning information that enables a subscription connection with the network) to request the provisioning of a VSIM to enable access on a second wireless communication network. The subscription management system may include one or more servers configured to provide a SIM profile to the wireless communication device. The wireless communication device may use the received SIM profile to configure a VSIM application (referred to herein as a VSIM) in memory on the device. The SIM profile may configure the VSIM application to emulate a physical SIM that supports a subscription used to communicate with an associated communication network (referred to as a second network), thereby enabling operation as a MSMS device. The VSIM-associated communication network may authenticate that the wireless communication device is authorized by the network operator. An authentication procedure may include receiving, on the wireless communication device, an authentication request from the associated communication network, and sending a response to the associated communication network, which may allow the wireless communication device to utilize the VSIM network.

In various embodiments, an RF resource of a MSMS device may be configured to be shared between a plurality of SIMs, but may be employed by default to perform communications on a network enabled by a first SIM, such as a network capable of high-speed data communications (e.g., WCDMA, HSDPA, LTE, etc.). As such, a modem stack associated with a second SIM, such as a VSIM, of the device may often be in idle mode with respect to a second network. Depending on the radio access technology of the second network, such idle mode states may involve implementing a power saving mode that includes a cycle of sleep and awake states. For example, if the second network is a GSM network, during idle mode the modem stack associated with the second SIM (e.g., a VSIM) may implement discontinuous reception (DRX).

Various embodiments may be implemented within a variety of communication systems, such as the example communication system 100 illustrated in FIG. 1A. The communication system 100 may include one or more wireless devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 includes a plurality of cell base stations 110 coupled to a network operations center 112, which operates to connect voice and data calls between the wireless devices 102 (e.g., tablets, laptops, cellular phones, etc.) and other network destinations, such as via telephone land lines (e.g., a "plain old telephone service" (POTS) network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

Figure 1B:
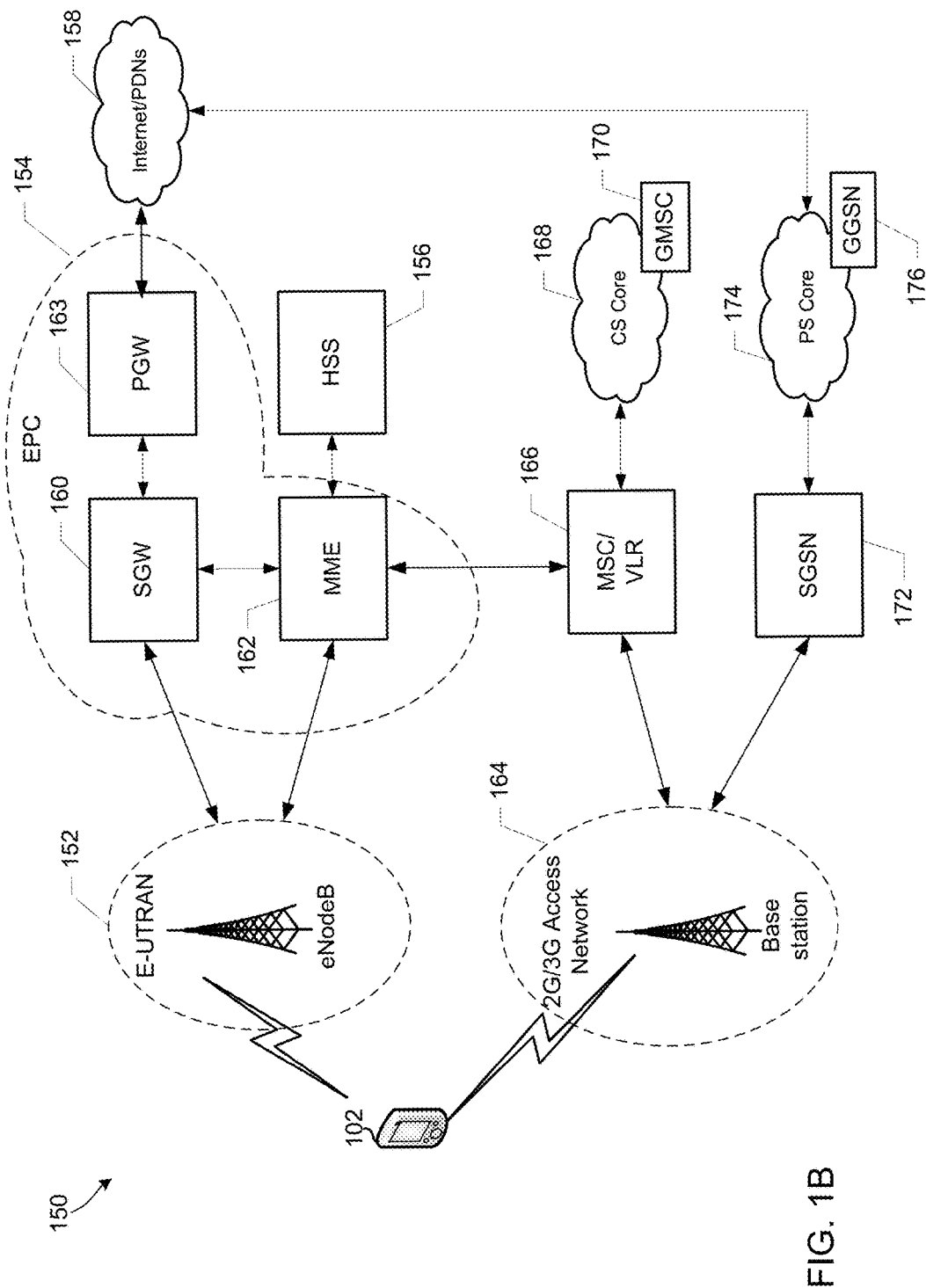
FIG. 1B is a block diagram of a network architecture suitable for use with the various embodiments.

FIG. 1B illustrates a network architecture 150 that includes multiple core networks for packet-switched communications. With reference to FIGS. 1A-1B, in the network architecture 150 the wireless device 102 may connect to an LTE access network, for example, an Evolved UMTS Terrestrial Radio Access Network (E-UTRAN) 152. In the various embodiments, the E-UTRAN 152 may be a network of LTE base stations (i.e., eNodeBs) (e.g., 110 in FIG. 1A), which may be connected to one another via an X2 interface (e.g., backhaul) (not shown).

In various embodiments, each eNodeB in the E-UTRAN 152 may provide an access point to an LTE core network, such as an evolved packet core (EPC) 154. In various embodiments, the EPC 154 may include at least one Mobility Management Entity (MME) 162, a Serving Gateway (SGW) 160, and a Packet Data Network (PDN) Gateway (PGW) 163.

In various embodiments, the E-UTRAN 152 may connect to the EPC 154 by connecting to the SGW 160 and to the MME 162 within the EPC 154. The MME 162, which may also be logically connected to SGW 160, may handle tracking and paging of the wireless device 102 and security for E-UTRAN access on the EPC 154. The MME 162 may be linked to a Home Subscriber Server (HSS) 156, which may support a database containing user subscription, profile, and authentication information. Further, the MME 162 provides bearer and connection management for user internet protocol (IP) packets, which are transferred through the SGW 160.

The SGW 160 may route incoming and outgoing IP packets for the wireless device 102 via the LTE access network and external IP networks (i.e., packet data networks (PDNs)). The SGW 160 may also provide an anchor point for handover between eNodeBs. The SGW 160 may be logically connected to a PDN Gateway (PGW) 163, which may route packets to and from PDNs to form a connection between the EPC and various PDNs. The PGW 163 may be logically connected to a Policy Charging and Rules Function (PCRF), a software component that may enforce minimum quality of service parameters, and manage and control data sessions. The PGW 163 may also provide connections with other public or private networks (e.g., the Internet, an Intranet, an IP Multimedia Subsystem (IMS), a PS Streaming Service (PSS), etc.).

The network architecture 150 may include circuit-switched networks and additional packet-switched (PS) networks. In some embodiments, the wireless device 102 may be connected to the CS and/or PS packet switched networks by connecting to a legacy second generation (2G)/third generation (3G) access network 164. In some embodiments, the 2G/3G access network 164 may be, for example, one or more UTRAN, GSM Enhanced Data rates for Global Evolution (EDGE) Radio Access Network (GERAN), CDMA2000 1×RTT, CDMA2000 1×EV-DO, etc. In the various embodiments, the 2G/3G access network 164 may include a network of base stations (e.g., base transceiver stations (BTSs), nodeBs, radio base stations (RBSs), etc.) (e.g., 110), as well as at least one base station controller (BSC) or radio network controller (RNC). In various embodiments, the 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

In various embodiments, the 2G/3G access network 164 may connect to the PS network via an interface with (or gateway to) a Serving GPRS support node (SGSN) 172, which may connect to a PS core 174. In the PS network, the PS core 174 may be connected to external PS networks (i.e., various PDNs 158) through a Gateway GPRS support node (GGSN) 176.

Figure 2:
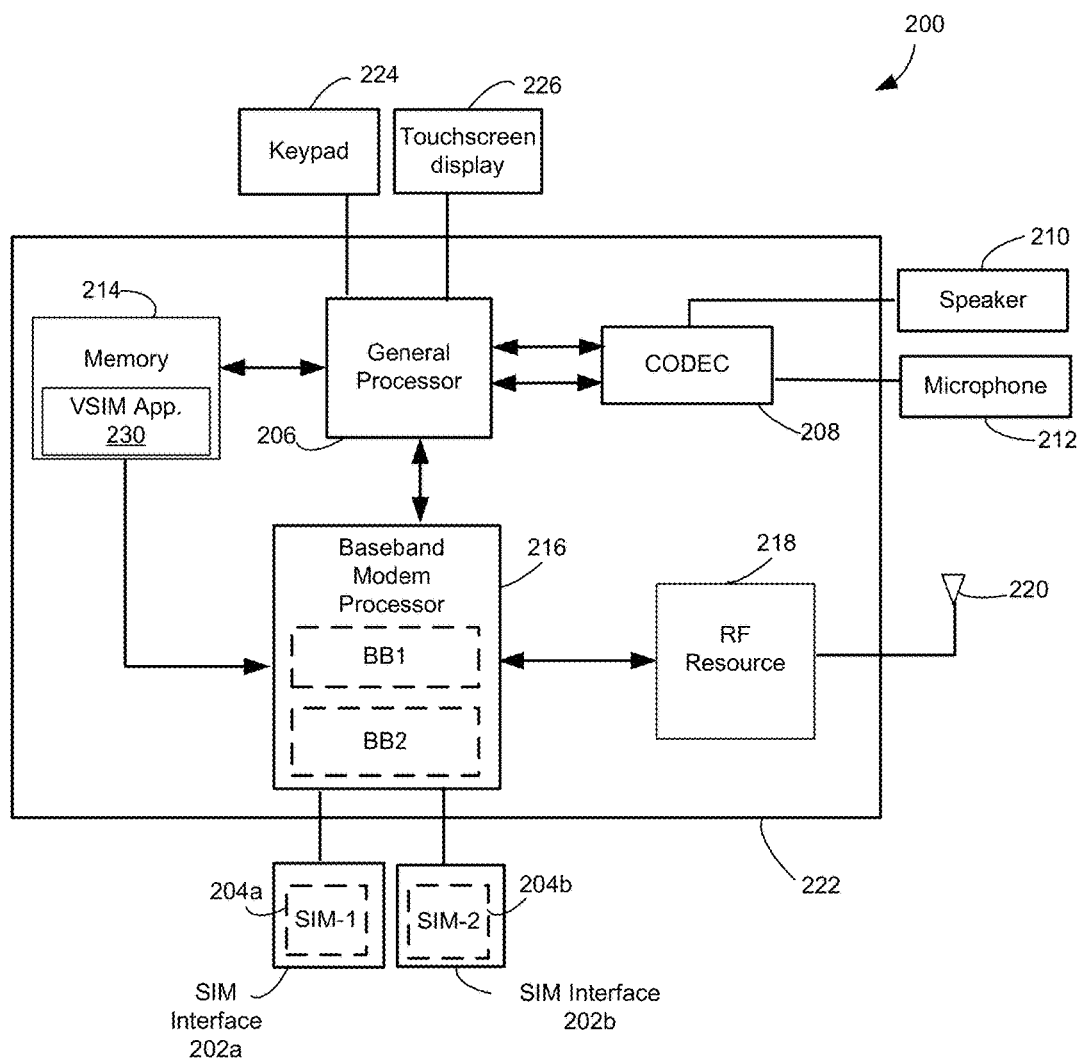
FIG. 2 is a block diagram illustrating a wireless communication device suitable for use with various embodiments.

FIG. 2 is a functional block diagram of an example wireless communication device 200 that is suitable for implementing various embodiments. With reference to FIGS. 1A and 1B, the wireless communication device 200 may be similar to one or more of the wireless devices 102. The wireless communication device 200 may include one or more SIM interfaces 202a, 202b, which may receive a physical SIM 204a, 204b that each may be associated with a subscription.

The SIM 204a, 204b in various embodiments may be a Universal Integrated Circuit Card (UICC) that is configured with a SIM and/or USIM applications, enabling access to GSM and/or UMTS networks. The UICC may also provide storage for a phone book and other applications. Alternatively, in a code division multiple access (CDMA) network, the SIM 204a, 204b may be a UICC removable user identity module (R-UIM) or a CDMA subscriber identity module (CSIM) on a card. The physical SIMs 204a, 204b in various embodiments may have stored user account information, an IMSI a set of SIM application toolkit (SAT) commands and storage space for phone book contacts. The SIMs 204a, 204b may further store home identifiers (e.g., a System Identification Number (SID)/Network Identification Number (NID) pair, a home public land mobile network (HPLMN) code, etc.) to indicate the SIM network operator provider. An Integrated Circuit Card Identity (ICCID) SIM serial number may be printed on the SIMs 204a, 204b for identification.

The wireless communication device 200 may also include at least one VSIM application 230, which may be stored in memory 214 of the wireless communication device 200 and configured to support a subscription in a manner similar to physical SIMs 204a, 204b. In various embodiments, the VSIM may represent any of a number of SIM profiles obtained through SIM provisioning/registration, as described. Each SIM 204a, 204b may have a CPU, ROM, RAM, EEPROM and I/O circuits.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general purpose processor 206 may also be coupled to the at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

The general purpose processor 206 and memory 214 may each be coupled to at least one baseband-modem processor 216. Each SIM 204a, 204b in the wireless communication device 200 may be associated with a baseband-RF resource chain that includes at least one baseband-modem processor 216 and at least one RF resource 218. In some embodiments, the wireless communication device 200 may be a dual-SIM dual standby (DSDS) device, with both SIMs 204a, 204b sharing a single baseband-RF resource chain that includes the baseband-modem processor 216 and RF resource 218. In some embodiments, the shared baseband-RF resource chain may include, for each of the first SIM 204a and the VSIM 230, separate baseband-modem processor 216 functionality (e.g., BB1 and BB2). The RF resource 218 may be coupled to at least one antenna 220, and may perform transmit/ receive functions for the wireless services associated with each SIM 204a, 204b of the wireless communication device 200. The RF resource 218 may implement separate transmit and receive functionalities, or may include a transceiver that combines transmitter and receiver functions.

In some embodiments, the general purpose processor 206, memory 214, baseband-modem processor 216, and RF resource 218 may be included in a system-on-chip device 222. The physical SIMs 204a, 204b and their corresponding interface(s) 202 may be external to the system-on-chip device 222. Further, various input and output devices may be coupled to components of the system-on-chip device 222, such as interfaces or controllers. Example user input components suitable for use in the wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them, as is known in the art.

Figure 3:
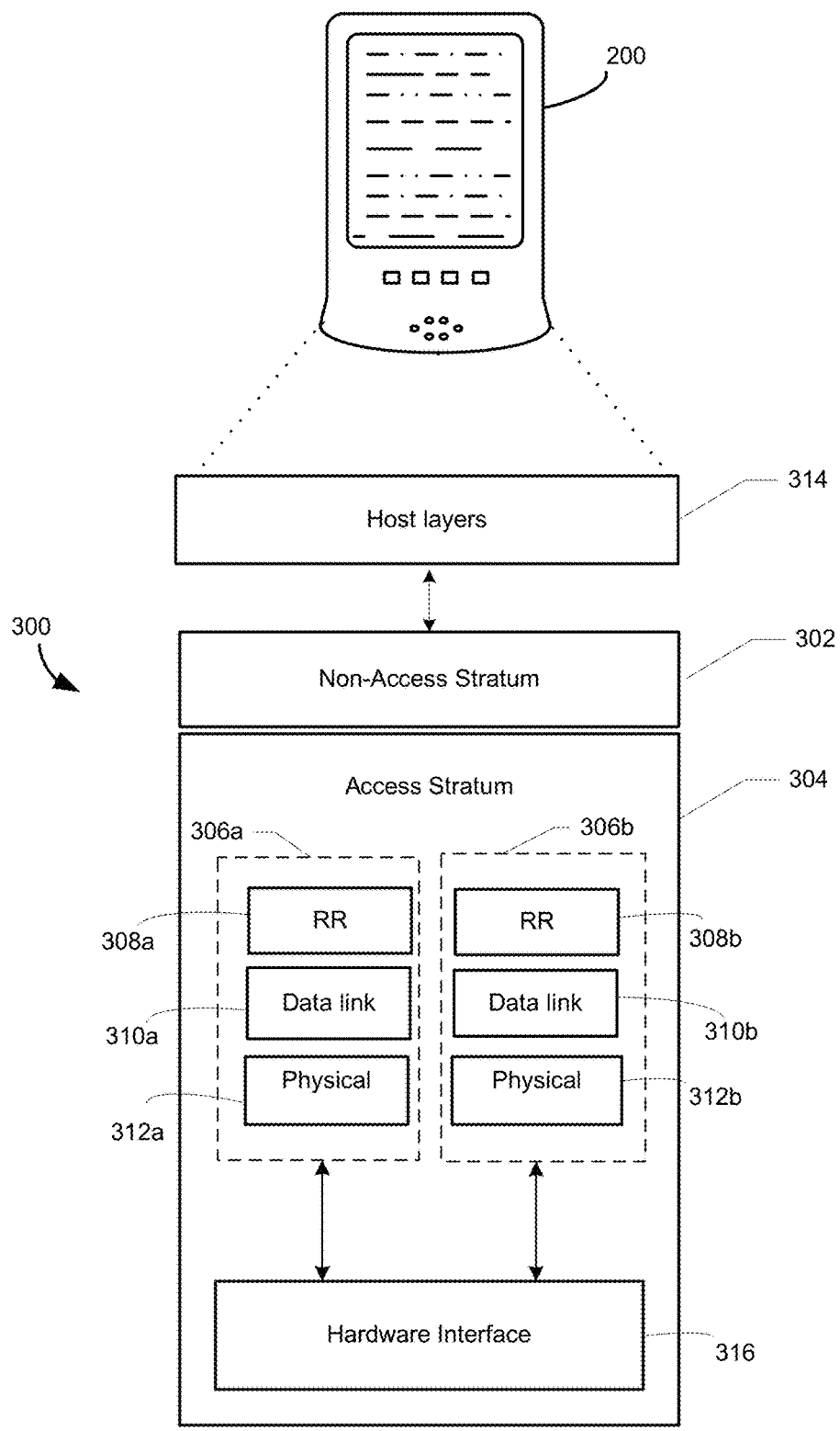
FIG. 3 is a system architecture diagram illustrating example protocol layer stacks implemented by the wireless communication device of FIG. 2.

FIG. 3 illustrates an example of software architecture with layered radio protocol stacks that may be used in data communications on a MSMS wireless communication device.

Referring to FIGS. 1-3, the wireless communication device 200 may have a layered software architecture 300 to communicate over access networks associated with SIMs. The software architecture 300 may be distributed among one or more processors, such as baseband-modem processor 216. The software architecture 300 may also include a Non Access Stratum (NAS) 302 and an Access Stratum (AS) 304. The NAS 302 may include functions and protocols to support traffic and signaling each SIM of the wireless communication device 200 (e.g., a physical SIM/SIM-1 204a, and a VSIM 230) and their respective core networks. The AS 304 may include functions and protocols that support communication between each SIM (e.g., the first SIM 204a, a VSIM 230) and entities of their respective access networks (e.g., a MSC in a GSM network, eNodeB in an LTE network, etc.).

In the wireless communication device 200, the AS 354 may include multiple protocol stacks, each of which may be associated with a different SIM. For example, the AS 304 may include protocol stacks 306a, 306b, associated with the first SIM 204a and the VSIM 230, respectively. Although described below with reference to GSM-type communication layers, protocol stacks 306a, 306b may support any of variety of standards and protocols for wireless communications. In particular, the AS 304 may include at least three layers, each of which may contain various sublayers. For example, each protocol stack 306a, 306b may respectively include a Radio Resource management (RR) sublayer 308a, 308b as part of Layer 3 (L3) of the AS 304 in a GSM or LTE signaling protocol. The RR sublayers 308a, 308b may oversee the establishment of a link between the wireless communication device 200 and associated access networks. In the various embodiments, the NAS 302 and RR sublayers 308a, 308b may perform the various functions to search for wireless networks and to establish, maintain and terminate calls. Further, the RR sublayers 308a, 308b may provide functions including broadcasting system information, paging, and establishing and releasing a radio resource control (RRC) signaling connection between a multi-SIM wireless communication device 200 and the associated access network. While not shown, the software architecture 300 may include additional Layer 3 sublayers, as well as various upper layers above Layer 3.

Additional sub-layers may include, for example, connection management (CM) sub-layers (not shown) that route calls, select a service type, prioritize data, perform QoS functions, etc.

Residing below the Layer 3 sublayers (RR sublayers 308a, 308b), the protocol stacks 306a, 306b may also include data link layers 310a, 310b, which may be part of Layer 2 in a GSM or LTE signaling protocol. The data link layers 310a, 310b may provide functions to handle incoming and outgoing data across the network, such as dividing output data into data frames and analyzing incoming data to ensure the data has been successfully received In some embodiments, each data link layer 310a, 310b may contain various sublayers, such as a media access control (MAC) sublayer, a radio link control (RLC) sublayer, and a packet data convergence protocol (PDCP) sublayer, each of which form logical connections terminating at the access network. In various embodiments, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ.

In the uplink, the MAC sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, DRX, and HARQ operations.

Residing below the data link layers 310a, 310b, the protocol stacks 306a, 306b may also include physical layers 312a, 312b, which may establish connections over the air interface and manage network resources for the wireless communication device 200. In various embodiments, the physical layers 312a, 312b may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stacks 306a, 306b provide functions to transmit data through physical media, the software architecture 300 may further include at least one host layer 314 to provide data transfer services to various applications in the wireless communication device 200.

In some embodiments, application-specific functions provided by the at least one host layer 314 may provide an interface between the protocol stacks 306a, 306b and the general processor 206. In some embodiments, the protocol stacks 306a, 306b may each include one or more higher logical layers (e.g., transport, session, presentation, application, etc.) that provide host layer functions. For example, in some embodiments, the software architecture 300 may include a network layer (e.g., IP layer) in which a logical connection terminates at a gateway (e.g., PGW 163). In some embodiments, the software architecture 300 may include an application layer in which a logical connection terminates at another device (e.g., end user device, server, etc.). In some embodiments, the software architecture 300 may further include in the AS 304 a hardware interface 316 between the physical layers 312a, 312b and the communication hardware (e.g., one or more RF resource).

In various embodiments, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

The modem stacks in various embodiments may support any of a variety of current and/or future protocols for wireless communications. For examples, the modem stacks in various embodiments may support networks using radio access technologies described in 3GPP standards (e.g., GSM, UMTS, LTE, etc.), 3GPP2 standards (e.g., 1×RTT/CDMA2000, Evolved Data Optimized (EVDO), Ultra Mobile Broadband (UMB), etc.) and/or Institute of Electrical and Electronics Engineers (IEEE) standards Worldwide Interoperability for Microwave Access (WiMAX), Wi-Fi, etc.).

In various embodiments, a MSMS wireless communication device may attach to a network associated with the first SIM (i.e., first network). The wireless communication device may use the connection with the first network to perform normal data communication on the first SIM, as well as communicate with a subscription management system in order to acquire a VSIM profile. Once received, the VSIM profile may be loaded in the VSIM application. For example, the wireless communication device may initiate a packet switched connection with the subscription management system on the network associated with the first SIM through the first protocol stack. The packet switched connection may involve, on the network layer of the first protocol stack, establishing a data structure. For example, for a UMTS network associated with the first SIM, the wireless device may activate a primary or secondary packet data protocol (PDP) context. In another example, for an LTE network associated with the first SIM, the wireless device may establish a default or dedicated evolved packet system (EPS) bearer. In various embodiments, such data structure may generally be referred to herein as a "data bearer," regardless of the particular network technology and/or communication protocol being used. In various embodiments, the established data bearer may provide the wireless device with access to a PDN access through a PGW (e.g., 163), a GGSN (e.g., 176), etc.

The subscription management system may be at least one remote server on a PDN (e.g., the Internet). The at least one remote server may be accessed on the wireless communication network associated with the first SIM (i.e., a first network) through an established PDP context or bearer. That is, the wireless device may use the established PDP context or bearer of the first network to send packets to and receive packets from at least one network entity (e.g., a remote server). In implementations, a network entity may belong to a Long Term Evolution (LTE) network (e.g., an eNodeB and/or a mobility management entity (MME)). In other implementations, a network entity may belong to a UTRAN network (e.g., a nodeB). As such, connecting to at least one network entity may involve assignment of an IP bearer (e.g., a default or dedicated IP bearer) or a PDP context (e.g., a primary or secondary PDP context) by the first network. In some embodiments, the at least one remote server may include a provisioning server and an associated subscription pool database. In some embodiments, the provisioning server may be a subscription manager or a SIM server associated with a virtual network operator.

In various embodiments, the subscription pool database may store a group of SIM profiles, or may provide access to a set of physical UICCs that are each configured with a SIM. Various components of a subscription management system may be co-located in a single physical device, and/or the functions thereof may be performed by any of a number of other components.

A number of approaches may be employed to provision the VSIM application on the wireless communication device. The subscription management system may receive a request from the VSIM application on the wireless device for a new SIM profile, which may be triggered based on a user input. In some embodiments, the request received by the remote server may be automatically triggered by a condition or change on the wireless communication device that may be detected by an application or module. Such conditions may include, for example, changes in location, differences in the services offered by various network operators (e.g., differences in type of service, cost, quality of service (QoS), etc.), user preferences (i.e., settings in the wireless device that may be sent to the provisioning server), data limits of tariff plans associated with current network operators, etc.

In various embodiments, the SIM profile request may be received from the wireless device in a Short Message Service (SMS) or Unstructured Supplementary Service Data (USSD) message sent over the first network.

A remote server of the subscription management system (e.g., a provisioning server) may receive the request from the VSIM application. Upon receiving the request, VSIM provisioning may proceed according to remote credential management described in the standards (for example, GSM Association, Official Document 12FAST.13 entitled "Embedded SIM Remote Provisioning Architecture), including recognizing the provisioning server as being a subscription manager. Specifically, the subscription manager (i.e., provisioning server) may select a new SIM profile from a group of SIM profiles stored in a subscription pool database associated with the subscription manager. In some embodiments, the selection of a new SIM profile from the subscription pool database may be based on the request from the VSIM application. In some embodiments, the selection of the new SIM profile from the subscription pool database may be based, in whole or in part, on or more internal policies of the subscription management system.

The subscription manager may utilize standard or proprietary remote credential management procedures to provision the new SIM profile as a VSIM application as the VSIM of the wireless device. Such procedures may be protected by keys that are already shared between the device (or VSIM application/module in the device) and the subscription manager. The provisioning may involve sending registration information describing a SIM profile to the wireless device on the data bearer established by the first SIM, and using the registration information to configure the VSIM application according to the described SIM profile.

In some embodiments, the new SIM profile may be a set of provisioning information that includes a network operator's access algorithms and selection of data, including at least one server address (e.g., IP or URL) for the network operator, IMSI, an operator controlled public land mobile network (PLMN) list, a forbidden PLMN list, and a specific authentication key (Ki or K). Once the provisioning is complete, the wireless device may use the new SIM profile by sending and receiving data through the VSIM application.

Following VSIM provisioning, the wireless communication device may be able to operate in a dual-SIM, dual-standby configuration (or other MSMS configuration) with both a first SIM and the VSIM (e.g., SIM profile loaded in VSIM application) set up for communication. The VSIM application may attach to the network associated with the VSIM (sometimes referred to herein as a "second network"), opening another packet-switched domain between the VSIM application and that network. The communication network associated with the VSIM may send an authentication request to the device through the VSIM application. The authentication request may originate from a mobile management entity, radio network controller, or GGSN of the network, and be communicated to the wireless communication device through a base station of the network.

The authentication request may include an authentication token (AUTN) and a random number (RAND). An authentication response may be generated from the authentication request through a calculation utilizing the AUTN, RAND, and a root key stored by the remote server. In order to perform the authentication procedure; however, the VSIM application must be granted access to the RF resource.

As described, in an MSMS device, a shared RF resource is used to support two SIMs when both SIMs are in idle mode, but one SIM at a time when at least one SIM transitions out of idle mode. Conventionally, sharing requires the SIMs to contend for access to the RF resource using a priority-based arbitration/time-sharing mechanism. In some embodiments, multi-SIM wireless communication devices may implement DRX on the modem stack associated with an idle mode SIM, such that the DSDS device will still monitor system information from, and maintain a connection with, the serving network of an idle mode SIM. That is, the RF resource periodically tunes away from communication on one SIM in order to tune to a channel associated with another SIM. However, such tune-aways are typically brief and limited to certain activities/times (e.g., decoding of paging channel, etc.).

When a VSIM is implemented by a VSIM application, the RF resource is shared between the modem stacks associated with each of the first SIM and the VSIM. A particular problem with this situation arises when the RF resource tunes to the network associated with the first SIM before or during the authentication of the VSIM implemented by the VSIM application. A tune away at such a time delays the exchange of authentication communications between the wireless communication device and the network associated with the VSIM. As a result, the network associated with the VSIM may declare a radio link failure or another time-out condition after a certain period of time, requiring restarting the authentication processes. This restarting of the authentication processes may impact the user experience, making the VSIM subscription/network appear to be unreliable.

In various embodiments, the wireless device may prioritize data packets of communications between the VSIM application and the second network that are for VSIM management procedures, particularly VSIM authentication. In various embodiments, each packet related to a VSIM management procedure may be tagged with an appropriate means of identification such that the data can be detected without reading the packet. In some embodiments, the tag may take the form of an additional subscription or packet type identifier conveyed throughout the protocol stack. In some embodiments, tag may be a specific format identifier within some existing information field. In various embodiments, the uplink data packets associated with a VSIM management procedure may be tagged at a point of origin (e.g., VSIM modem stack).

When there is an active communication on the modem stack associated with the first SIM, a data bearer established between the modem stack associated with the first SIM and a PDN through the first network may also be used for data communication with a network associated with the VSIM (i.e., second network). Such use of the data bearer may be accomplished using a proxy, marshalling, or other multiplexing technique to carry packets from the modem stack associated with the VSIM application as if part of the communication on the first SIM. That is, the data from a communication associated with the VSIM communication can piggy-back onto the existing connection supporting the communications on the first network associated with the first (i.e., physical) SIM, allowing the shared RF resource to serve both SIMs without requiring any time sharing mechanism or access arbitration. In this manner, access to the single RF resource is not contested on a per-subscription basis, but rather the data from both the modem stack associated with the first SIM and the modem stack associated with the VSIM application may be prioritized on a per-packet basis in the context of being associated with the same SIM.

A first example mechanism for supporting data packets in a communication on the VSIM application by a data bearer associated with the first SIM is through a direct proxy. That is, a module or program associated with the VSIM application may tag the data packets to be proxied with sufficient information to ensure routing to the correct network access point (i.e., PDN), and passes those tagged data packets to the modem stack associated with the first SIM. The modem stack associated with the first SIM may handle relaying of the VSIM data packets in the same manner as data in the communication on the first SIM. In some embodiments, such handling may involve prioritizing data based on a policy dynamically selected by a scheduler.

When downlink data for the VSIM is sent by the second network, such data may be received by the wireless device using the data bearer on the modem stack associated with the first SIM. The data for the VSIM may then be passed to the VSIM application through signaling between the modem stacks associated with the VSIM application and with the first SIM.

In some embodiments, when there is no active communication on the modem stack associated with the first SIM, a new data bearer may be established by the modem stack associated with the VSIM application.

In various embodiments, a scheduler may detect the type of data bearer established for the shared RF resource, and based on the type, select an appropriate prioritization scheme for transmitting data. For example, if the data bearer is established on the modem stack associated with the first SIM, the prioritization scheme may provide first priority to any critical data packets to be transmitted on the modem stack associated with the first SIM, followed by the tagged VSIM management packets, and finally any other data packets to be transmitted on the modem stack associated with the first SIM. If the data bearer is established on the modem stack associated with the VSIM application, the prioritization scheme may provide first priority to the tagged VSIM management packets, followed by all other data packets to be transmitted on the modem stack associated with the VSIM application.

Figure 4:
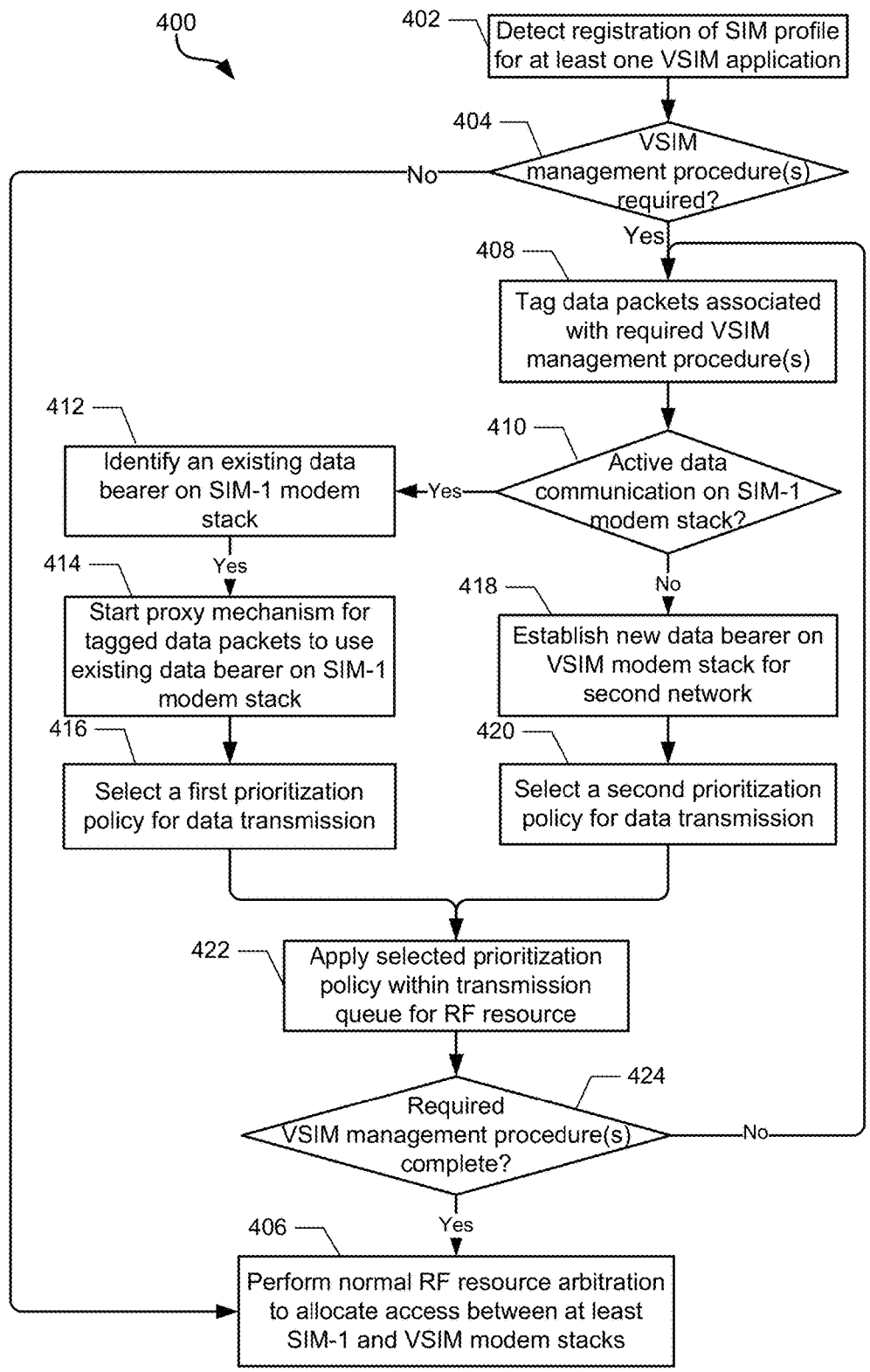
FIG. 4 is a process flow diagram illustrating a method for enabling transmission of data associated with a required VSIM management procedure on a multi-SIM wireless communication device according to various embodiments.

FIG. 4 illustrates a method 400 for scheduling data communications to provide improved prioritization for VSIM management procedures according to various embodiments. With reference to FIGS. 1A-4, the multi-SIM multi-standby device (e.g., 102, 200) may be configured with a single shared RF resource (e.g., 318) that supports at least the first SIM ("SIM-1" in FIG. 4) and a VSIM. In various embodiments, the operations of the method 400 may be implemented by one or more processors of the multi-SIM wireless communication device, such as a general-purpose processor (e.g., 206) and/or baseband-modem processor (e.g., 216). In some embodiments, the operations of the method 400 may be implemented by a separate controller (not shown) that may be coupled to memory (e.g., 214) and to the one or more processors.

Although described with reference to a first SIM stored on a physical UICC and a VSIM implemented as a profile in a VSIM application, the method 400 may be applied to a variety of other device configurations, including multi-SIM devices configured with more than two SIMs, more than two VSIM applications, etc.

In block 402, a processor of a multi-SIM wireless communication device may detect registration of a SIM profile for at least one VSIM application on the wireless communication device, in addition to the physical first SIM. In some embodiments, SIM profiles may be registered for multiple VSIM applications, each of which enables operation as an additional SIM on the wireless communication device (e.g., third SIM, fourth SIM, etc.). In various embodiments, registration of the VSIM may be performed by communicating with a subscription management system via a data bearer assigned by the network associated with the first SIM as described. Following registration, the wireless communication device may be configured with multi-SIM multi-standby capability.

In determination block 404, the processor may determine whether at least one VSIM management procedure is required on the wireless communication device. Such VSIM management procedures may include, for example, authentication by the second network in order to enable the wirelesses communication device to perform communications on the modem stack associated with the VSIM application. In response to determining that no VSIM management procedure is required (i.e., determination block 404="No"), the processor may allow normal RF resource arbitration to allocate access between the modem stacks associated with the first SIM and the VSIM in block 406.

In response to determining that at least one VSIM management procedure is required (i.e., determination block 404="Yes"), the processor may tag data packets associated with the VSIM management procedure(s) in block 408. As described, in some embodiments, the tag may be an additional identifier passed through the modem stack associated with the VSIM. In some embodiments, the tag may be an identifier within an existing information field in the data packets. Such tagging serves to identify a high priority of the data for VSIM management, and to identify the source or destination (for uplink and downlink data, respectively) for routing of data on the wireless communication device for the subscription supported by the VSIM (e.g., a second subscription and second network associated with the VSIM).

In determination block 410, the wireless device processor may determine whether there is an active communication on the modem stack associated with the first SIM. For example, the user of the wireless communication device may be participating in an active voice or data call, receiving a particular streaming service, participating in an interactive website, etc.

In response to determining that there is an active communication activity on the modem stack associated with the first SIM (i.e., determination block 410="Yes"), the processor may identify an existing data bearer on the modem stack associated with the first SIM in block 412. For example, the existing data bearer may be a primary or secondary PDP context, a default or dedicated EPS bearer, or another type of data session, depending on the particular radio access technology employed by the network associated with the first SIM.

In block 414, the processor may start a proxy mechanism for the tagged data packets to use the existing data bearer on the modem stack associated with the first SIM. That is, processor may enable the data packets for the VSIM management procedure to be passed to the modem stack of the first SIM and handled in the same manner as data in the communication activity on the first SIM.

In block 416, the processor may select a first prioritization policy for data transmissions on the RF resource. In various embodiments, selection of the prioritization policy may be based on the type of underlying bearer, and may be adaptively performed by a scheduler. The scheduler may be a processor-executable software module running on the wireless communication device, and may be pre-configured with any of a number of prioritization policies from which to select. Details of an example first prioritization policy are further described with reference to FIG. 5A.

Again with reference to FIGS. 1A-4, in response to determining that there is no active communication on the modem stack associated with the first SIM (i.e., determination block 410="No"), the processor may establish a new data bearer on the modem stack associated with the VSIM for the second network in block 418. That is, since no concurrent communication is competing for access to the RF resource, a data bearer may be established specifically between the modem stack associated with the VSIM and the network in which the VSIM management procedure is required (e.g., second network).

In block 420, the processor may select a second prioritization policy for data transmission. Similar to the selection of the first prioritization policy (e.g., block 416), the selection of the second prioritization policy may be performed by a scheduler, and may be based on the underlying data bearer (e.g., a dedicated bearer on the modem stack of the VSIM).

In block 422, the processor may apply the selected prioritization policy (i.e., the first prioritization policy selected in block 416 or the second prioritization policy selected in block 420) within the transmission queue for the RF resource.

In determination block 424, the processor may determine whether the required VSIM management procedures are complete. In response to determining that the required VSIM management procedures are not complete (i.e., determination block 424="No"), the wireless device processor may continue to tag data packets associated with required VSIM management procedure(s) in block 408. In response to determining that the required VSIM management procedures are complete (i.e., determination block 424="Yes"), the processor may return to normal RF resource arbitration to allocate access between the modem stacks associated with the at least first SIM and VSIM in block 406.

Figure 5A:
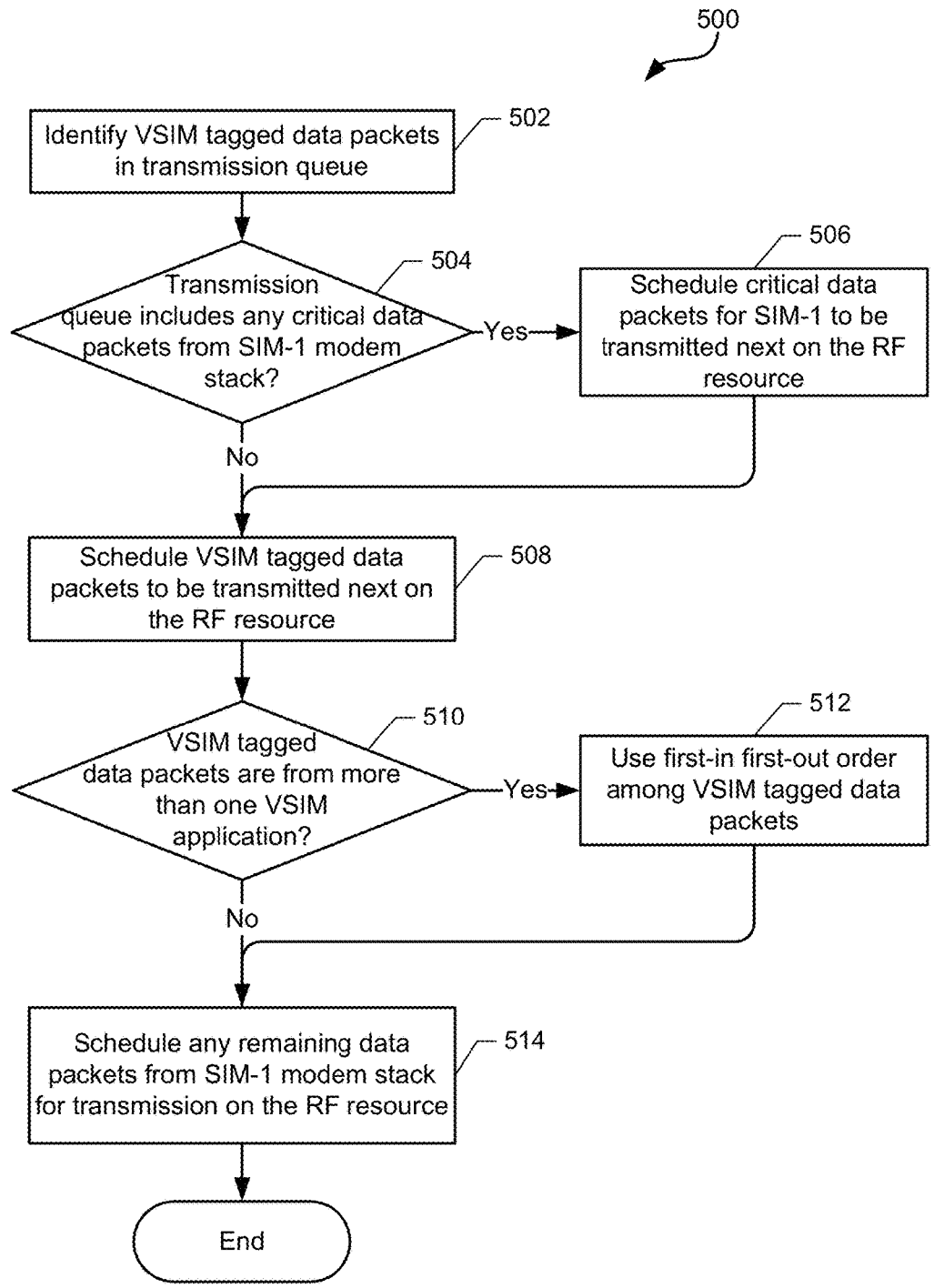
FIGS. 5A and 5B are process flow diagrams illustrating example methods for applying a prioritization policy in the method illustrated in FIG. 4 according to various embodiments.

FIG. 5A illustrates a method 500 of implementing block 422 of the method 400 (FIG. 4A) for an example MSMS wireless communication device (e.g., 102, 200) configured with at least one VSIM application according to some embodiments. With reference to FIGS. 1A-5A, the operations of the method 500 may be implemented by one or more processor of the multi-SIM wireless communication device 200, such as the general purpose processor 206 and/or baseband modem processor(s) 216, or a separate controller (not shown) that may be coupled to the memory 214 and to the baseband modem processor(s) 216. In various embodiments, the operations of method 500 provide an example of the first prioritization policy selected in block 416 of the method 400, and may involve transmission using the existing data bearer on the modem stack associated with the first SIM identified in block 412 of the method 400.

In block 502, the processor may identify the VSIM tagged data packets from block 408 of the method 400 in the transmission queue for the RF resource. In determination block 504, the processor may determine whether the transmission queue includes any critical data packets from the modem stack associated with the first SIM.

In response to determining that the transmission queue includes critical data packets from the modem stack associated with the first SIM (i.e., determination block 504="Yes"), the processor may schedule the critical data packets from the modem stack associated with the first SIM to be transmitted next on the RF resource in block 506.

Following scheduling of critical data packets in block 506 or in response to determining that the transmission queue does not include any critical data packets from the modem stack associated with the first SIM (i.e., determination block 504="No"), the processor may schedule the VSIM tagged data packets to be transmitted next on the RF resource in block 508. As described, the wireless communication device may have multiple VSIM applications, each of which may be provisioned with a SIM profile (e.g., VSIM).

In determination block 510, the processor may determine whether the VSIM tagged data packets are from more than one VSIM application. In some embodiments, the processor may determine the source of the VSIM tagged data packets based on identification information in the tag.

In response to determining that the VSIM tagged data packets are from more than one VSIM application (i.e., determination block 510="Yes"), the processor may apply a first-in first-out priority order among the VSIM tagged data packets in block 512. In other embodiments, other prioritization may be determined in any other suitable manner.

Upon applying a first-in first-out priority order among the VSIM tagged data packets in block 512 or in response to determining that the VSIM tagged data packets are not from more than one VSIM application (i.e., determination block 510="No"), the processor may schedule any remaining data packets from the modem stack associated with the first SIM for transmissions on the RF resource in block 514, and then end the method 500.

In various embodiments, scheduling the remaining data packets may involve using internal priorities that may be configured by for the first SIM, for example. In various embodiments, such internal priorities may be set, for example, by the device manufacturer, a user, the first network operator, etc.

Figure 5B:
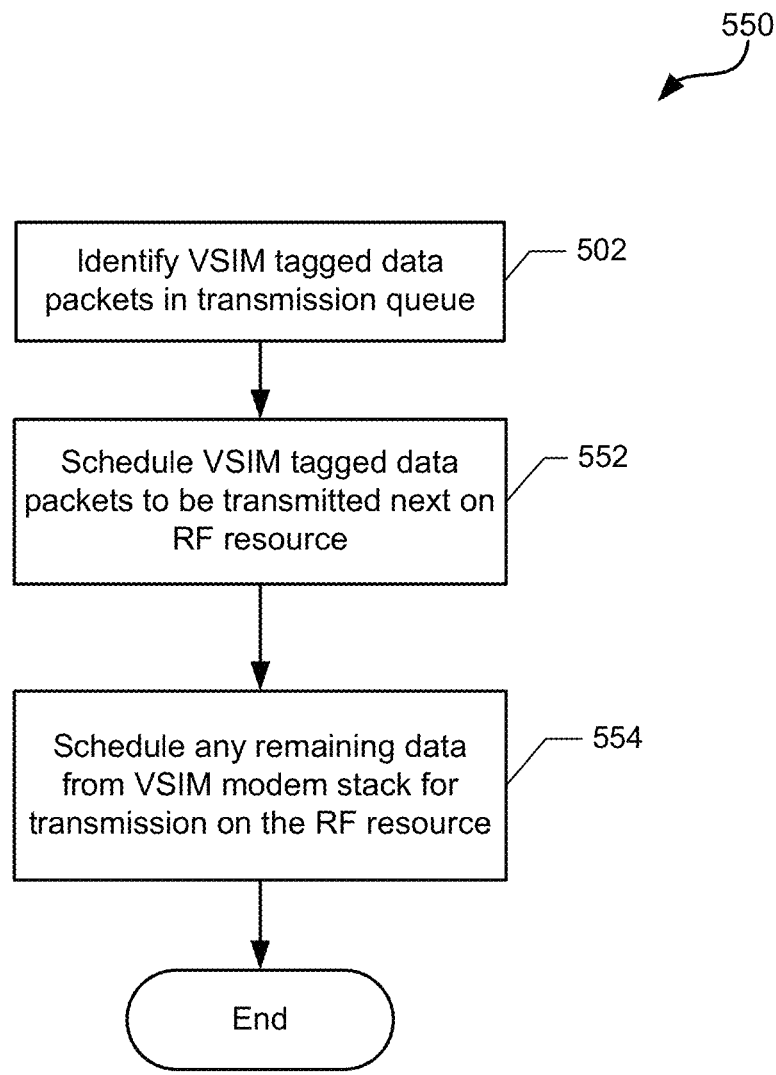

FIG. 5B illustrates a method 550 of implementing block 422 of the method 400 (FIG. 4A) on an example MSMS wireless communication device configured with at least one VSIM application (e.g., 102, 200) according to some embodiments. With reference to FIGS. 1A-5B, the operations of the method 550 may be implemented by one or more processor of the multi-SIM wireless communication device 200, such as the general purpose processor 206 and/or baseband modem processor(s) 216, or a separate controller (not shown) that may be coupled to the memory 214 and to the baseband modem processor(s) 216. In various embodiments, the operations of method 550 provide an example of the second prioritization policy selected in block 420 of the method 400, and may be involve transmission using the bearer for the modem stack associated with the VSIM established in block 418 of the method 400.

In block 502, the processor may identify VSIM tagged data packets in a transmission queue as described for the like numbered block of the method 500. In block 552, the processor may schedule the VSIM tagged data packets to be transmitted next on the RF resource.

In block 554, the processor may schedule any remaining data packets from the modem stack associated with the VSIM for transmission on the RF resource. In various embodiments, scheduling the remaining data packets may involve using internal priorities that are configured by or for the VSIM. In various embodiments, such internal priorities may be set, for example, by provisioning processes associated with the VSIM application, by a user, the second network operator, the subscription management system, etc. The processor may end the prioritization of method 550.

In various embodiments, the prioritization policies illustrated in FIGS. 5A and 5B are merely examples, as any suitable policy that enables prioritizing data for a required VSIM management procedure may be used by the scheduler. In some embodiments, various prioritization policies may also be dynamically developed or updated based on various factors. For example, if radio conditions are poor for the second network, the first prioritization policy may be adapted to prioritize data packets associated with the VSIM management procedure(s) ahead of even critical priority data packets from the first SIM due to the increased likelihood of impending radio link failure on the second network.

While the SIM profile implemented by the VSIM application is referred to herein as a single VSIM, the VSIM application may be provisioned with any of a number of selectable SIM profiles available through the subscription database, which are collectively referred to as a VSIM with no intention of limiting the various embodiments to a single SIM profile stored as single VSIM. Further, references to the VSIM application are intended to encompass a plurality of VSIM applications reflecting a plurality of different SIM profiles that may reside in memory or other storage device of the wireless communication device.

The references to a physical SIM as the first SIM/SIM-1 supporting a first subscription and to a SIM profile in a VSIM application as a VSIM supporting a second subscription are arbitrary and used merely for the purposes of describing the embodiments, and the wireless device processor may assign any indicator, name or other designation to differentiate the SIMs/SIM profiles and associated modem stacks.

Figure 6:
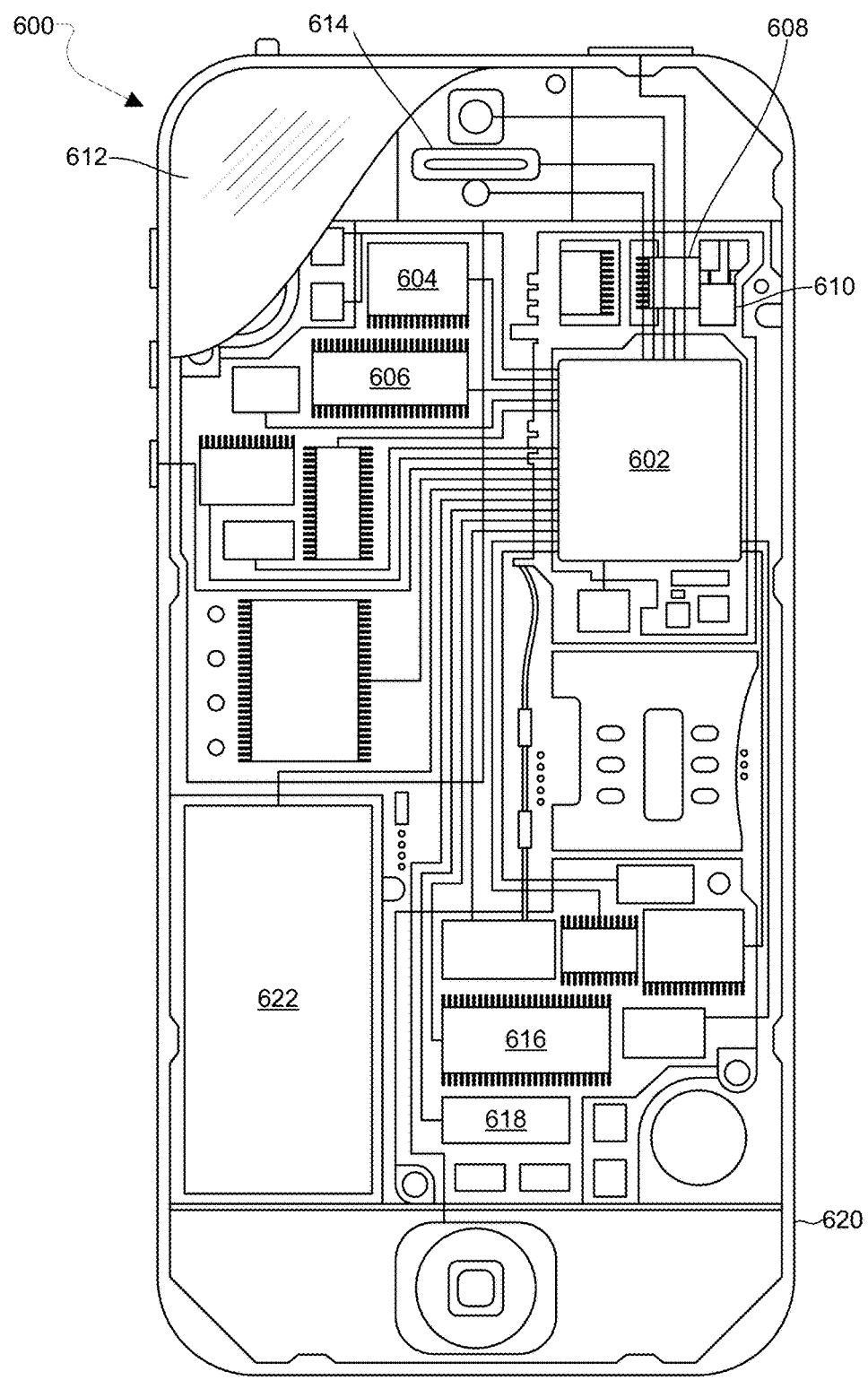
FIG. 6 is a component diagram of an example wireless communication device suitable for use with various embodiments.

Various embodiments may be implemented in any of a variety of wireless devices, an example of which is illustrated in FIG. 6. For example, With reference to FIGS. 1A-6, a wireless device 600 (which may correspond, for example, the wireless devices 102, 200 in FIGS. 1A-2) may include a processor 602 coupled to a touchscreen controller 604 and an internal memory 606. The processor 602 may be one or more multicore integrated circuits (ICs) designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor. The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
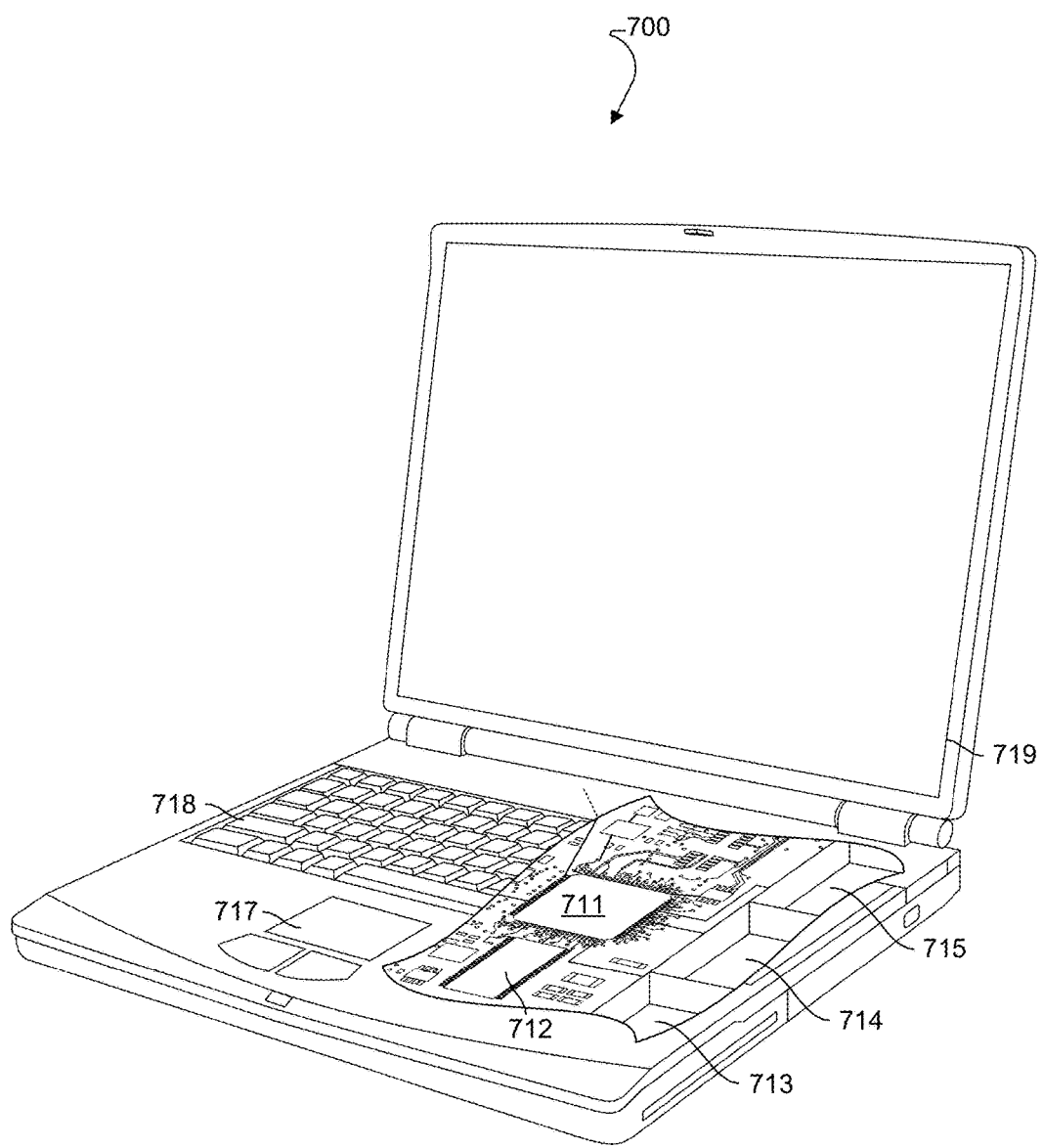
FIG. 7 is a component diagram of another example wireless communication device suitable for use with various embodiments.

Various embodiments described above may also be implemented within a variety of personal computing devices, such as a laptop computer 700 (which may correspond, for example, the wireless devices 102, 200 in FIGS. 1A-2) as illustrated in FIG. 7. With reference to FIGS. 1A-7, many laptop computers include a touchpad touch surface 717 that serves as the computer's pointing device, and thus may receive drag, scroll, and flick gestures similar to those implemented on wireless computing devices equipped with a touch screen display and described above. The laptop computer 700 will typically include a processor 711 coupled to volatile memory 712 and a large capacity nonvolatile memory, such as a disk drive 713 of Flash memory. The laptop computer 700 may also include a floppy disc drive 714 and a compact disc (CD) drive 715 coupled to the processor 711. The laptop computer 700 may also include a number of connector ports coupled to the processor 711 for establishing data connections or receiving external memory devices, such as a Universal Serial Bus (USB) or FireWire® connector sockets, or other network connection circuits for coupling the processor 711 to a network. In a notebook configuration, the computer housing includes the touchpad touch surface 717, the keyboard 718, and the display 719 all coupled to the processor 711. Other configurations of the computing device may include a computer mouse or trackball coupled to the processor (e.g., via a USB input) as are well known, which may also be use in conjunction with various embodiments.

The processors 602 and 711 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606, 712 and 713 before they are accessed and loaded into the processors 602 and 711. The processors 602 and 711 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiment, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for scheduling data packet transmissions on a multi-subscriber identity module (SIM) wireless communication device having a physical SIM and a virtual SIM (VSIM) application, each associated with a shared radio frequency (RF) resource, the method comprising:
   detecting registration of a SIM profile for the VSIM application;
   determining whether a VSIM management procedure is required for the VSIM application; and
   in response to determining that the VSIM management procedure is required for the VSIM application:
      tagging data packets associated with the VSIM management procedure;
      selecting a prioritization policy for data packet transmissions on the RF resource; and
      applying the selected prioritization policy within a transmission queue on the RF resource.

2. The method of claim 1, wherein selecting the prioritization policy for data packet transmissions on the RF resource comprises selecting the prioritization policy for data packet transmissions on the RF resource by a scheduler based on a type of data structure employed on the RF resource.

3. The method of claim 2, further comprising:
   determining whether a modem stack associated with the physical SIM has an active data communication; and
   establishing a dedicated bearer for a modem stack associated with the VSIM application in response to determining that the modem stack associated with the physical SIM does not have an active data communication.

4. The method of claim 3, further comprising:
   identifying an existing data bearer on the modem stack associated with the physical SIM in response to determining that the modem stack associated with the physical SIM has an active data communication; and
   implementing a proxy mechanism to allow data packets from the modem stack associated with the VSIM application to be carried on the existing data bearer,
   wherein the scheduler selects a first prioritization policy as the selected prioritization policy for data transmissions on the RF resource.

5. The method of claim 4, wherein applying the selected prioritization policy comprises:
   determining whether the transmission queue includes any critical data packets from the modem stack associated with the physical SIM; and
   in response to determining that the transmission queue includes critical data packets from the modem stack associated with the physical SIM:
      assigning a first transmission priority to the critical data packets;
      assigning a second transmission priority to the tagged data packets associated with the required VSIM management procedure; and
      assigning a last transmission priority to non-critical data packets from the modem stack associated with the physical SIM; and
   in response to determining that the transmission queue does not include any critical data packets from the modem stack associated with the physical SIM:
      assigning the first transmission priority to the tagged data packets associated with the required VSIM management procedure; and assigning the second transmission priority to non-critical data packets from the modem stack associated with the physical SIM.

6. The method of claim 3, further comprising:
selecting, by the scheduler, a second prioritization policy as the selected prioritization policy for data transmissions on the RF resource; and
assigning the dedicated bearer to enable communication on a network supported by the VSIM application.

7. The method of claim 6, further comprising:
assigning a first transmission priority to the tagged data packets associated with the required VSIM management procedure; and
assigning a second transmission priority to data packets in user communications on the modem stack associated with the VSIM application.

8. The method of claim 1, wherein tagging data packets associated with the required VSIM management procedure comprises:
attaching an additional identifier to data packets associated with the required VSIM management procedure,
wherein the additional identifier provides information describing a high priority of the VSIM management procedure and the VSIM application as a point of origin or destination, and
wherein the additional identifier is conveyed throughout a modem stack associated with the VSIM application.

9. The method of claim 1, wherein tagging data packets associated with the required VSIM management procedure comprises providing an identifier within an existing information field in protocol data units (PDUs) for at least one layer in a modem stack associated with the VSIM application.

10. The method of claim 1, wherein the required VSIM management procedure comprises authentication on a network associated with the VSIM application.

11. A wireless communication device, comprising:
a shared radio frequency (RF) resource configured to connect to a physical subscriber identity module (SIM) and a virtual SIM (VSIM) application; and
a processor coupled to the shared RF resource and configured with processor-executable instructions to:
detect registration of a SIM profile for the VSIM application;
determine whether a VSIM management procedure is required for the VSIM application; and
in response to determining that the VSIM management procedure is required for the VSIM application:
tag data packets associated with the VSIM management procedure;
select a prioritization policy for data packet transmissions on the RF resource; and
apply the selected prioritization policy within a transmission queue on the RF resource.

12. The wireless communication device of claim 11, wherein the processor is further configured with processor-executable instructions to select the prioritization policy for data packet transmissions on the RF resource by a scheduler based on a type of data structure employed on the RF resource.

13. The wireless communication device of claim 12, wherein the processor is further configured with processor-executable instructions to:
determine whether a modem stack associated with the physical SIM has an active data communication; and
establish a dedicated bearer for a modem stack associated with the VSIM application in response to determining that the modem stack associated with the physical SIM does not have an active data communication.

14. The wireless communication device of claim 13, wherein the processor is further configured with processor-executable instructions to:
identify an existing data bearer on the modem stack associated with the physical SIM in response to determining that the modem stack associated with the physical SIM has an active data communication; and
implement a proxy mechanism to allow data packets from the modem stack associated with the VSIM application to be carried on the existing data bearer,
wherein the scheduler selects a first prioritization policy as the selected prioritization policy for data transmissions on the RF resource.

15. The wireless communication device of claim 13, wherein the processor is further configured with processor-executable instructions to apply the selected prioritization policy by:
determining whether the transmission queue includes any critical data packets from the modem stack associated with the physical SIM; and
in response to determining that the transmission queue includes critical data packets from the modem stack associated with the physical SIM:
assigning a first transmission priority to the critical data packets;
assigning a second transmission priority to the tagged data packets associated with the required VSIM management procedure; and
assigning a last transmission priority to non-critical data packets from the modem stack associated with the physical SIM; and
in response to determining that the transmission queue does not include any critical data packets from the modem stack associated with the physical SIM:
assigning the first transmission priority to the tagged data packets associated with the required VSIM management procedure; and
assigning the second transmission priority to non-critical data packets from the modem stack associated with the physical SIM.

16. The wireless communication device of claim 13, wherein the processor is further configured with processor-executable instructions to:
select, by the scheduler, a second prioritization policy as the selected prioritization policy for data transmissions on the RF resource; and
assign the dedicated bearer to enable communication on a network supported by the VSIM application.

17. The wireless communication device of claim 16, wherein the processor is further configured with processor-executable instructions to:
assign a first transmission priority to the tagged data packets associated with the required VSIM management procedure; and
assign a second transmission priority to data packets in user communications on the modem stack associated with the VSIM application.

18. The wireless communication device of claim 11, wherein the processor is further configured with processor-executable instructions to tag data packets associated with the required VSIM management procedure by:
attaching an additional identifier to data packets associated with the required VSIM management procedure, wherein the additional identifier provides information describing a high priority of the VSIM management procedure and the VSIM application as a point of origin or destination, and wherein the additional identifier is conveyed throughout a modem stack associated with the VSIM application.

19. The wireless communication device of claim 11, wherein the processor is further configured with processor-executable instructions to tag data packets associated with the required VSIM management procedure by providing an identifier within an existing information field in protocol data units (PDUs) for at least one layer in a modem stack associated with the VSIM application.

20. The wireless communication device of claim 11, wherein the required VSIM management procedure comprises authentication on a network associated with the VSIM application.

21. A wireless communication device, comprising:
a radio frequency (RF) resource configured to connect to a physical subscriber identity module (SIM) and a virtual SIM (VSIM) application;
means for detecting registration of a SIM profile for the VSIM application;
means for determining whether a VSIM management procedure is required for the VSIM application;
means for tagging data packets associated with the VSIM management procedure in response to determining that the VSIM management procedure is required for the VSIM application;
means for selecting a prioritization policy for data packet transmissions on the RF resource; and
means for applying the selected prioritization policy within a transmission queue on the RF resource.

22. A non-transitory processor-readable storage medium having stored thereon processor-executable instructions configured to cause a processor of a wireless communication device having a radio frequency (RF) resource configured to connect to a physical subscriber identity module (SIM) and a virtual SIM (VSIM) application to perform operations comprising:
detecting registration of a SIM profile for the VSIM application;
determining whether a VSIM management procedure is required for the VSIM application; and
in response to determining that the VSIM management procedure is required for the VSIM application:
tagging data packets associated with the VSIM management procedure;
selecting a prioritization policy for data packet transmissions on the RF resource; and
applying the selected prioritization policy within a transmission queue on the RF resource.

23. The non-transitory processor-readable storage medium of claim 22, wherein the stored processor-executable instructions are configured to cause the processor to perform operations such that selecting the prioritization policy for data packet transmissions on the RF resource comprises selecting the prioritization policy for data packet transmissions on the RF resource by a scheduler based on a type of data structure employed on the RF resource.

24. The non-transitory processor-readable storage medium of claim 23, wherein the stored processor-executable instructions are configured to cause the processor to perform operations further comprising:
determining whether a modem stack associated with the physical SIM has an active data communication; and
establishing a dedicated bearer for a modem stack associated with the VSIM application in response to determining that the modem stack associated with the physical SIM does not have an active data communication.

25. The non-transitory processor-readable storage medium of claim 24, wherein the stored processor-executable instructions are configured to cause the processor to perform operations further comprising:
identifying an existing data bearer on the modem stack associated with the physical SIM in response to determining that the modem stack associated with the physical SIM has an active data communication; and
implementing a proxy mechanism to allow data packets from the modem stack associated with the VSIM application to be carried on the existing data bearer,
wherein the scheduler selects a first prioritization policy as the selected prioritization policy for data transmissions on the RF resource.

26. The non-transitory processor-readable storage medium of claim 25, wherein the stored processor-executable instructions are configured to cause the processor to perform operations such that applying the selected prioritization policy comprises:
determining whether the transmission queue includes any critical data packets from the modem stack associated with the physical SIM; and
in response to determining that the transmission queue includes critical data packets from the modem stack associated with the physical SIM:
assigning a first transmission priority to the critical data packets;
assigning a second transmission priority to the tagged data packets associated with the required VSIM management procedure; and
assigning a last transmission priority to non-critical data packets from the modem stack associated with the physical SIM; and
in response to determining that the transmission queue does not include any critical data packets from the modem stack associated with the physical SIM:
assigning the first transmission priority to the tagged data packets associated with the required VSIM management procedure; and
assigning the second transmission priority to non-critical data packets from the modem stack associated with the physical SIM.

27. The non-transitory processor-readable storage medium of claim 24, wherein the stored processor-executable instructions are configured to cause the processor to perform operations further comprising:
selecting, by the scheduler, a second prioritization policy as the selected prioritization policy for data transmissions on the RF resource; and
assigning the dedicated bearer to enable communication on a network supported by the VSIM application.

28. The non-transitory processor-readable storage medium of claim 27, wherein the stored processor-executable instructions are configured to cause the processor to perform operations further comprising:
assigning a first transmission priority to the tagged data packets associated with the required VSIM management procedure; and
assigning a second transmission priority to data packets in user communications on the modem stack associated with the VSIM application.

29. The non-transitory processor-readable storage medium of claim 22, wherein the stored processor-executable instructions are configured to cause the processor to perform operations such that tagging data packets associated with the required VSIM management procedure comprises:

attaching an additional identifier to data packets associated with the required VSIM management procedure, wherein the additional identifier provides information describing a high priority of the VSIM management procedure and the VSIM application as a point of origin or destination, and wherein the additional identifier is conveyed throughout a modem stack associated with the VSIM application.

30. The non-transitory processor-readable storage medium of claim 22, wherein the stored processor-executable instructions are configured to cause the processor to perform operations such that tagging data packets associated with the required VSIM management procedure comprises providing an identifier within an existing information field in protocol data units (PDUs) for at least one layer in a modem stack associated with the VSIM application.

* * * * *